United States Patent Office 3,709,935
Patented Jan. 9, 1973

3,709,935
SUBSTITUTED GLYOXAL DITHIOSEMI-CARBAZONES
Paul Anthony Barrett, 183–193 Euston Road, London, England
No Drawing. Filed Mar. 18, 1969, Ser. No. 826,038
Claims priority, application Great Britain, Mar. 26, 1968, 14,529/68
Int. Cl. C07c *159/00*
U.S. Cl. 260—552 SC  8 Claims

ABSTRACT OF THE DISCLOSURE

Novel semicarbazones useful in the treatment of anaplasmosis having the formula:

$$R^1O-\overset{R^2}{\underset{|}{C}H}-C=N.NH.CS.NH.R^3$$
$$H\overset{|}{C}=N.NH.CS.NH.R^4$$

wherein $R^1$ is a methyl or ethyl group, $R^2$ is a hydrogen atom or a methyl group, and $R^3$ and $R^4$ are different, each being a hydrogen atom, a methyl, or an ethyl group.

---

This invention relates to anaplasmicidal glyoxal dithiosemicarbazones, and to the treatment of anaplasmosis in cattle.

It has already been disclosed in British Patent Specification No. 1,097,333 that a class of glyoxal dithiosemicarbazones derivatives showed activity against anaplasmosis in cattle. This disease is prevalent in large areas of the Asian, African, American and Australasion continents and certain Southern areas of Europe which have a mediterranean type of climate. The infecting organism, *Anaplasma marginale*, attacks the red blood cells of the cattle, characteristically causing anaemia, general debility, and fever of the animal, which often prove fatal.

It has now been found that two undisclosed members of this class, namely α-ethoxyethylglyoxal 1-(4′-methylthiosemicarbozone) - 2-thiosemicarbazone and α-ethoxyethylgloxal 1 - thiosemicarbazone - 2-(4′-methylthiosemicarbazone), show an unexpectedly high degree of activity against anaplasmae, when intravenously administered to cattle. The latter compound also manifests unusually high activity when given subcutaneously and produce a good suppression of anaemia. In addition to these advantages, both compounds are less toxic than the best compound of the previously disclosed group. The closest similarly unsymmetrical homologues, with respect to the thiosemicarbazone residues, namely α-ethoxyethylglyoxal 1-thiosemicarbazone-2,4′-ethylthiosemicarbazone
α-methoxyethylglyoxal -1,4′-methylthiosemicarbazone-2-thiosemicarbazone
α-methoxyethylglyoxal 1-thiosemicarbazone-2,4′-methylthiosemicarbazone
methoxymethylglyoxal 1-thiosemicarbazone-2,4′-methyl-thiosemicarbazone, and
ethoxymethylglyoxal 1-thiosemicarbazone-2,4′-methyl-thiosemicarbazone also show advantages in this respect.

The present invention therefore provides compounds of Formula III $$R^1O-\overset{R^2}{\underset{|}{C}H}-C=N.NH.CS.NH.R^3$$
$$H\overset{|}{C}=N.NH.CS.NH.R^4 \quad (III)$$

wherein $R^1$ is a methyl or ethyl group, $R^2$ is a hydrogen atom or a methyl group, and $R^3$ and $R^4$ are different, each being an hydrogen atom, a methyl, or an ethyl group. In particular there are provided the compounds hereinbefore listed, especially α - ethoxyethylglyoxal 1-thiosemicarbazone - 2,4′ - methylthiosemicarbazone and α-ethoxyethylglyoxal 1,4′ - methylthiosemicarbazone-2-thiosemicarbazone.

In another aspect the present invention provides formulations containing any of the compounds of Formula III, as hereinbefore defined, or of the above list, in association with a therapeutically acceptable carrier. In a further aspect the invention provides a method of treating anaplasmosis in cattle, comprising the parenteral or oral administration of an effective dosage of these compounds to the infected animal.

The compounds according to the present invention may conveniently be prepared by adaptation of methods known, in actual use or described in the literature, on the subject.

The methods include standard techniques for producing unsymmetrical dithiosemicarbazones by reacting the corresponding glyoxal with one equivalent of a thiosemicarbazide and then with one equivalent of another thiosemicarbazide, or produce the thiosemicarbazone chains stagewise from other starting materials. The desired compound must, of course, be isolated from the resulting mixture of symmetrical and various unsymmetrical compounds by methods known for separation of mixture.

It has also been found that a dialkylacetal mono-thiosemicarbazone of Formula II can most advantageously be used for the preparation of the desired unsymmetrical dithiosemicarbazones by reacting this derivative with a substituted or unsubstituted thiosemicarbazide different from that used in the preparation of Formula II. The novel starting compound of Formula II.

$$RO^1-\overset{R^2}{\underset{|}{C}H}-C=N.NH.CS.NH.R^3$$
$$H\overset{OZ_1}{\underset{OZ_2}{C}} \quad (II)$$

wherein $Z_1$ and $Z_2$ are the same or different, and each is an alkyl group, preferably a lower alkyl group having from 1 to 5 carbon atoms, can conveniently be obtained by reacting the corresponding α-alkoxyalkylglyoxal-1-dialkylacetal with thiosemicarbazide, 4-methyl- or 4-ethyl-thiosemicarbazide, preferably in a polar solvent such as ethanol. The resulting α - alkoxyalkylglyoxal 1 - dialkyl-acetal-2-thiosemicarbazone or 2-(4′-methyl- or ethylthiosemicarbazone) is conveniently reacted with 4-methyl- or 4 - ethylthiosemicarbazide or thiosemicarbazide, respectively, in ethanol in the presence of a strong acid. The compounds are sparingly soluble and separate from the reaction mixture. They can be obtained in a pure form by recrystallization, for instance from water containing some alcohol.

The products obtained by these methods are substantially homogeneous, but may be contaminated with small amounts of the two corresponding symmetrical dithiosemicarbazones. If required, these can be removed by special purification methods known in the art. This is, however, hardly necesasry, since the contaminents have similar properties and their effect is insignificant.

The compounds according to the present invention may be presented in the formulations suitable for oral or parenteral administration. For example, the oral preparations may be tablets, capsules, granules, powder, suspension, or solutions, which may contain diluents, binding agents, dispersing agents, surface-active agents, lubricating agents, coating materials, colouring agents, solvents, thickening agents, suspending agents, or other therapeutically acceptable additives, and these preparations may be presented in unit-dose form or multi-dose form, or as additives to feedstuffs. The injectable form may be a nonaqueous solution for instance in dimethyl sulphoxide or dimethylacetamide or suspension in a therapeutically acceptable liquid or mixture of liquids, which may contain bacteriostatic agents, anitoxidants, buffers, solutes to render the solution isotonic with the blood, thickening agents, suspending agents, or other therapeutically acceptable additives. Such preparations are presented in unit-dose forms such as ampoules or disposable injection devices, or in multi-dose forms such as a bottle from which the appropriate doses may be withdrawn. All such preparations should preferably be rendered sterile.

For injections the compounds may be presented in the form of a sterile suspension containing up to 20% finely dispersed material in an acceptable meduim. Preferably the formulation contains 10% dispersed material at an average particle size below 10 μm.

Usually the dosage representing about 20 mg./kg. (orally) or 10 mg./kg. (intravenously or subcutaneously is sufficient for this purpose; significant improvements can occasionally be achieved with considerably lower dosages, such as about 5 mg./kg. or even 2.5 mg./kg.

Preferably the compounds according to the present invention, particularly α-ethoxyethylglyoxal 1-thiosemicarbazone-2-4'-methylthiosemicarbazone, can be advantageously presented for injection in a solution of dimethyl sulphoxide or dimethyl acetamide, to which propylene glycol has been added. For instance, a 10 to 20% solution of the active compound may be produced by dissolving the material in 2 to 8 volume parts of dimethyl sulphoxide or dimethylacetamide and making up the volume with propylene glycol to produce the required concentration.

The natural incubation period for anaplasmosis is about 20 to 50 days in cattle. Thus the smallest animal likely to be treated would be a seven-weeks old calf which would weigh about 40 to 50 kg. or more. Treating such an animal would require 200 to 500 mg. at a dose of about 5 to 10 mg./kg., but adult beasts would, of course, require a much larger dose.

In a further aspect, the present invention provides a method of preventing anaplasmosis in cattle, comprising the repeated intramuscular, subcutaneous or oral administration of the compounds as hereinbefore defined, in a dosage of about 1 mg./kg. per day to the animal for at least 10 days. In a further aspect, there is provided a method of sterilising the infection with *A. marginale* in carrier cattle comprising the oral administration of these compounds at a dosage of about 1 mg./kg. for a longer period.

The following examples illustrate the invention:

EXAMPLE 1

To α-ethoxyethylglyoxal diethylacetal (prepared by the method of Tiffany et al., J. Amer. Chem. Soc., (1957) 79, 1687) (61.2 g.) in absolute ethanol (300 ml.) was added finely ground thiosemicarbazide (27.3 g.) and the mixture stirred at room temperature for 3 days. The thiosemicarbazide had all passed into solution after 48 hours.

To the solution of α-ethoxyethylglyoxal diethylacetal 2-thiosemicarbazone so obtained was added finely ground 4-methylthiosemicarbazide (31.5 g.), and the mixture stirred and cooled in an ice-bath. Concentrated hydrochloric acid (30 ml.) was added dropwise over 30 minutes, and the mixture stirred at 0° C. for a further 6 hours. The mixture gradually thickened up with the separation of dithiosemicarbazone, which was filtered off, washed with a mixture of ethanol and light petroleum, and dried in vacuo over sodium hydroxide. The crude material (62 g., M.P. 190° C.) was recrystallised from water to which a little ethanol was added, to give α-ethoxyethylglyoxal 1-(4'-methylthiosemicarbazone)-2-thiosemicarbazone as pale yellow needles (51 g.), M.P. 192–193° C.

After a solution of α-ethoxyethylglyoxal diethylacetal 2-thiosemicarbazone prepared as described in the first paragraph is evaporated to dryness in vacuo an oil remains which solidifies on stirring with petrol, and may be recrystallised from ether/petrol to give the compound as colourless crystals, M.P. 68° C.

EXAMPLE 2

A mixture of α-ethoxyethylglyoxal diethylacetal (61.2 g.) and finely ground 4-methylthiosemicarbazide (31.5 g.) in absolute ethanol (100 ml.) was stirred at room temperature for 3 days. The 4-methylthiosemicarbazide was passed rapidly into solution. To the solution so obtained was added finely ground thiosemicarbazide (27.3 g.) and the mixture was stirred and cooled at 0° C. while concentrated hydrochloric acid (30 ml.) was added dropwise over 15 minutes and stirred at 0° for a further 6 hours. The precipitated dithiosemicarbazone was filtered off, washed with a mixture of ethanol and light petroleum and recrystallised from a mixture of equal parts of ethanol and water to give α-ethoxyethylglyoxal 1-thiosemicarbazone-2-(4'-methylthiosemicarbazone) as a yellow crystalline powder (35 g.), M.P. 186–7° C. (decomp.).

Alternatively, after stirring for 6 hours, the hydrochloric acid may be neutralised by the addition of saturated aqueous carbonate solution until the mixture is just alkaline to Billiant Yellow paper. The precipitated solid is then filtered off, washed with 50% aqueous ethanol and with water until free of inorganic material, dried in vacuo, and recrystallised to give the compound as described above.

EXAMPLE 3

α-Ethoxyethylglyoxal 1-thiosemicarbazone-2-4'-methylthiosemicarbazone was also prepared, using α-ethoxyethylglyoxal dimethylacetal (52.8 g.) (prepared by the method of Tiffany et al. (loc. cit.) using methanol instead of ethanol, and having B.P. 45–46° C./0.05 mm. Hg) in place of the diethylacetal used in Example 2.

EXAMPLE 4

By the method of Example 2, using 4-ethylthiosemicarbazide in place of 4-methylthiosemicarbazide, was obtained α-ethoxyethylglyoxal 1-thiosemicarbazone 2-4'-ethylthiosemicarbazone as pale yellow crystals having M.P. 175–176° C. (decomp.).

EXAMPLE 5

α-Methoxyethylglyoxal diethylacetal (prepared from α-methoxyethylglyoxal by the method of Tiffany et al. (loc. cit.) and having B.P. 100–105° C./14 mm. Hg) was reacted successively with equimolecular amounts of thiosemicarbazide and 4-methylthiosemicarbazide by the method of Example 1 to give α-methoxyethylglyoxal 1-4'-methyl thiosemicarbazone-2-thiosemicarbazone as pale yellow crystals, M.P. 186° C. (decomp.).

EXAMPLE 6

α-Methoxyethylglyoxal diethylacetal, described in Example 5, was reacted successively with equimolecular amounts of 4-methyl-thiosemicarbazide and thiosemicarbazide by the method of Example 2 to give α-methoxyethylglyoxal 1-thiosemicarbazone-2-4'-methylthiosemicarbazone as pale yellow crystals having M.P. 205° C. (decomp.).

EXAMPLE 7

Methoxymethylglyoxal diethylacetal (prepared by the method of Tiffany et al. (loc. cit.) from methoxymethylglyoxal, and having B.P. 95–100° C./12 mm. Hg) was reacted successively with equimolecular amounts of 4-methylthiosemicarbazide and thiosemicarbazide by the method of Example 2 to give methoxymethylglyoxal 1-thiosemicarbazone-2-4'-methyl thiosemicarbazone as pale yellow crystals having M.P. 189° C. (decomp.).

EXAMPLE 8

Ethoxymethylglyoxal diethylacetal (prepared by the method of Tiffany et al. (loc. cit.) from ethoxymethylglyoxal, and having B.P. 104–108° C./12 mm. Hg) was reacted successively wth equimolecular amounts of 4-methylthiosemicarbazide and thiosemicarbazide by the method of Example 2 to give ethoxymethylglyoxal 1-thiosemicarbazone-2-4'-methylthiosemicarbazone as pale yellow crystals having M.P. 180° C. (decomp.).

EXAMPLE 9

A solution for injection was prepared by using the following materials:

| | |
|---|---|
| α-Ethoxyethylglyoxal 1 - thiosemicarbazone - 2-4' methylthiosemicarbazone _____g__ | 10.0 |
| Dimethyl Sulphoxide (analytical reagent guide) ml__ | 50.0 |
| Propylene Glycol B.P., to make _____ml__ | 100 |

The active ingredient was completely dissolved in dimethyl sulphoxide by stirring, and the volume was made up to 100 w. with propylene glycol. The solution was sterilized by filtration through a solvinert millipove membrane filter under aseptic conditions.

The sterile solution was aseptically distributed into sterile 50 ml-vials. The vials were closed with sterile transparent latex plugs.

EXAMPLE 10

A solution for injection was prepared according to the method described in Example 9 by using the following formulation:

| | |
|---|---|
| α-Ethoxyethylglyoxal 1 - thiosemicarbazone - 2-4'-methylthiosemicarbazone _____g__ | 10.0 |
| Dimethyl sulphoxide (analytical reagent grade) ml__ | 80.0 |
| Propylene glycol B.P., to make _____ml__ | 100.0 |

EXAMPLE 11

A solution for injection was prepared according to the method described in Example 9 by using the following formulation:

| | |
|---|---|
| α - Ethoxyethylglyoxal 1 - thiosemicarbazone - 2-4'-methylthiosemicarbazone _____g__ | 20.0 |
| Dimethyl acetamide (analytical reagent grade) ml__ | 40.0 |
| Propylene glycol B.P., to make _____ml__ | 100 |

EXAMPLE 12

Tablets of α-ethoxyethylglyoxal 1-thiosemicarbazone-2-4'-methylthiosemicarbazone were made by granulating the compound (0.5 g.) in a fine powder with gelatin in alcohol and water, adding magnesium stearate (0.005 g.) as a lubricant, and compressing the mixture directly.

EXAMPLE 13

Tablets of α-ethoxyethylglyoxal 1-thiosemicarbazone-2,4'-methylthiosemicarbazone were made by mixing the compound with a diluent (lactose), a dispersing agent (starch), and a surface active agent (polyoxyethylene sorbitan monolaurate). The mixture was granulated with a 5.0% starch mucilage, dried, mixed with a lubricating agent (magnesium stearate) and compressed

| | G. |
|---|---|
| α-Ethoxyethylglyoxal 1 - thiosemicarbazone - 2,4'-methylthiosemicarbazone _____ | 0.25 |
| Lactose _____ | 0.25 |
| Starch _____ | 0.05 |
| Poloxyethylene sorbitan monolaurate _____ | 0.005 |
| Magnesium stearate _____ | 0.005 |

EXAMPLE 14

Three splenectomised calves were intravenously infected with 5 ml. blood parasitized with *A. marginale*. The proportion of erythracites was 24 to 37% in the donor animals. Five days later, the infected calves were intravenously administered 10 mg./kg. of α-ethoxyethylglyoxal 1-(4'-methyl-thiosemicarbazone)-2-thiosemicarbazone.

Results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 2812 | 10 | i./v. | 3.4 | 3.4 | 9.8 | 9.0 | — |
| 2836 | 10 | i./v. | 3.5 | 3.4 | 9.8 | 8.1 | — |
| 2810 | 10 | i./v. | 21 | 25 | 11.2 | 10.1 | — |

Very high degree of activity was observed with minimal fall in Hb.

EXAMPLE 15

Three splenectomised calves were intravenously infected with 5 ml. blood parasitized with *A. marginale*. The proportion of erythracites was 21 to 24% in the donor animals. Five to six days later, the infected calves were subcutaneously injected with 10 mg./kg. of α-ethoxyethylglyoxal 1-thiosemicarbazone - 2 - (4'-methylthiosemicarbazone).

Results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 2824 | 10 | s.c. | 2.3 | 9 | 11.2 | 9.8 | — |
| 2807 | 10 | s.c. | 3.2 | 4.5 | 12.2 | 10.9 | — |
| 2819 | 10 | s.c. | 22 | 30 | 10.5 | 6.7 | — |

A high degree of activity and a good suppression of anaemia was observed.

EXAMPLE 16

Three splenectomised calves were intravenously infected with 5 ml. blood parasitized with *A. marginale*. The proportion of erythracites was 18% in the donor animals. Five to seven days later, the infected calves were intravaneously injected with 10 mg./kg. of α-ethoxyethylglyoxal 1-thiosemicarbazone-2 - (4' - methyl-thiosemicarbazone).

Results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 2822 | 10 | i.v. | 2.4 | 7.6 | 10.5 | 9.2 | — |
| 2825 | 10 | i.v. | 2.2 | 3.8 | 11.9 | 9.5 | — |
| 2827 | 10 | i.v. | 23 | 31 | 9.8 | 3.2 | — |

A very high degree of activity and satisfactory suppression of anaemia were observed.

EXAMPLE 17

Again, three splenectomised calves were intravenously infected with 5 ml. blood parasitized *A. marginale*, to provide controls for the experiments described in Examples 3 to 5. The proportion of erythracites was 13 to 24% in the donor animals.

The results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 2809 | (¹) | | | 78 | | 3.2 | + |
| 2808 | (¹) | | | 92 | | 4.2 | + |
| 2826 | (¹) | | | 95 | | 3.6 | + |

¹ Untreated.

All three control animals died.

EXAMPLE 18

Three splenoctomised calves were infected, as in Example 16, and were subsequently intravenously injected with α-methoxyethylglyoxal - 1,4' - methylthiosemicarbazone-2-thiosemicarbazone in propylene glycol/dimethyl sulphoxide solution.

Results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 3193 | 10 | s.c. | 3 | 3 | 10.9 | 10.5 | — |
| 3185 | 10 | s.c. | 5.6 | 7.6 | 12.9 | 10.5 | — |
| 3184 | 10 | s.c. | 18 | 19 | 12.2 | 9.8 | — |

A high degree of activity against anaplasms with good suppression of anaemia was observed. There was no evidence of drug persisting at the injection site on autopsy in 3185 and 3184.

EXAMPLE 19

Three splenectomised calves were infected, as in Example 16, and were subsequently intravenously injected with α-methoxyethylglyoxal - 1 - thiosemicarbazone-2,4'-methylthiosemicarbazone.

Results were as follows:

| Animal No. | Dose D | Route | Percent erythracites, day D | Infected maximum percent | Hb g./100 ml. Day D | Hb g./100 ml. Minutes | Death |
|---|---|---|---|---|---|---|---|
| 3100 | 10 | s.c. | 6 | 7.2 | 11.2 | 10.5 | — |
| 3141 | 10 | s.c. | 7.5 | 13 | 14.3 | 10.5 | — |
| 3171 | 10 | s.c. | 21 | 29 | 15.3 | 8.8 | — |

High degree of activity against anaplasms was observed.

What we claim is:

1. A compound of Formula (III)

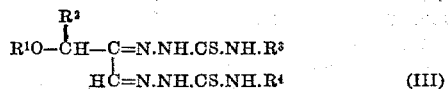

wherein $R^1$ is a methyl or ethyl group, $R^2$ is a hydrogen atom or a methyl group, and $R^3$ and $R^4$ are different, each being a hydrogen atom, a methyl, or an ethyl group.

2. α-Ethoxyethylglyoxal 1-thiosemicarbazone - 2 - 4'-methylthiosemicarbazone.

3. α-Ethoxyethylglyoxal 1 - 4' - methylthiosemicarbazone-2-thiosemicarbazone.

4. α-Ethoxyethylglyoxal 1-thiosemicarbazone - 2 - 4'-ethylthiosemicarbazone.

5. α-Methoxyethylglyoxal 1 - 4' - methylthiosemicarbazone-2-thiosemicarbazone.

6. α-Methoxyethylglyoxal 1 - thiosemicarbazone-2-4'-methylthiosemicarbazone.

7. Methoxymethylglyoxal 1 - thiosemicarbazone-2-4'-methylthiosemicarbazone.

8. Ethoxymethylglyoxal 1 - thiosemicarbazone - 2 - 4'-methylthiosemicarbazone.

References Cited

UNITED STATES PATENTS

| | | | |
|---|---|---|---|
| 3,321,362 | 5/1967 | Lemin | 260—552 SC |
| 3,382,275 | 5/1968 | Barrett | 260—552 SC |
| 3,520,924 | 7/1970 | Winkelmann | 260—552 SC |

FOREIGN PATENTS

| | | | |
|---|---|---|---|
| 763,949 | 7/1967 | Canada | 260—552 SC |

OTHER REFERENCES

Tiffany et al., J. Am. Chem. Soc., 1957, vol. 79, p. 1687.

BERNARD HELFIN, Primary Examiner

M. W. GLYNN, Assistant Examiner

U.S. Cl. X.R.

424—323